United States Patent
Lee et al.

(10) Patent No.: US 7,405,751 B2
(45) Date of Patent: Jul. 29, 2008

(54) IMAGE PHOTOGRAPHING APPARATUS HAVING PHOTOGRAPHIC MODE BASED ON POSITION OF CAMERA UNIT

(75) Inventors: Chang-hee Lee, Suwon (KR); Bum-cheol Park, Suwon (KR); Nam-il Kim, Suwon (KR); Tae-won Moon, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 767 days.

(21) Appl. No.: 10/680,418

(22) Filed: Oct. 8, 2003

(65) Prior Publication Data
US 2004/0212709 A1 Oct. 28, 2004

Related U.S. Application Data

(60) Provisional application No. 60/464,094, filed on Apr. 21, 2003.

(30) Foreign Application Priority Data

Oct. 9, 2002 (KR) .................. 10-2002-0061573
Jan. 8, 2003 (KR) .................. 10-2003-0001151

(51) Int. Cl.
H04N 5/225 (2006.01)
H04N 9/09 (2006.01)
H04N 5/232 (2006.01)
H04N 5/00 (2006.01)

(52) U.S. Cl. ............... 348/220.1; 348/262; 348/211.14; 386/120

(58) Field of Classification Search ............ 348/333.01, 348/333.06, 220.1, 373–376, 262, 211.14; 386/120; 358/906, 909.1
See application file for complete search history.

(56) References Cited

U.S. PATENT DOCUMENTS 5,442,453 A * 8/1995 Takagi et al. ................ 348/376

(Continued)

FOREIGN PATENT DOCUMENTS

EP 0 287 879 10/1988

(Continued)

OTHER PUBLICATIONS

Hojo et al.; "A 1/3-in 510(H)×492(V) CCD Image Sensor with Mirror Image Function"; May 1991; IEEE Transactions on Electron Devices; vol. 38, No. 5; pp. 954-959.*

(Continued)

*Primary Examiner*—John Villecco
(74) *Attorney, Agent, or Firm*—Staas & Halsey LLP

(57) ABSTRACT

An image photographing apparatus includes a body, on which a tape cassette is removably mounted, and a camera unit installed in the body and provided with a plurality of camera sections. The camera sections have different pixel numbers and the camera sections are independently driven. The image photographing apparatus also includes a mode sensing unit to sense a photographic mode to correspond to at least one of the camera sections, and a control unit to select a photographic mode according to a signal transferred from the mode sensing unit and to drive a camera unit to correspond to the selected photographic mode. The image photographing apparatus includes a display unit provided in the body to show an image photographed by at least one of the camera sections.

51 Claims, 19 Drawing Sheets

U.S. PATENT DOCUMENTS

| | | | | |
|---|---|---|---|---|
| 5,630,193 | A | * | 5/1997 | Miyake et al. ............... 396/539 |
| 5,903,706 | A | * | 5/1999 | Wakabayashi et al. ...... 348/373 |
| 5,926,218 | A | | 7/1999 | Smith et al. |
| 6,002,430 | A | * | 12/1999 | McCall et al. ......... 348/207.99 |
| 6,115,069 | A | * | 9/2000 | Kuroki et al. ................ 348/375 |
| 6,226,448 | B1 | * | 5/2001 | Takagi et al. ................. 348/373 |
| 6,714,192 | B1 | * | 3/2004 | Torres ..................... 348/220.1 |
| 6,727,939 | B1 | * | 4/2004 | Stekelenburg ............... 348/158 |
| 6,961,083 | B2 | * | 11/2005 | Obrador et al. .......... 348/220.1 |
| 7,084,919 | B2 | * | 8/2006 | Shibata et al. ......... 348/333.06 |
| 2002/0030749 | A1 | * | 3/2002 | Nakamura et al. ........... 348/220 |
| 2002/0067426 | A1 | * | 6/2002 | Nagata et al. ................ 348/373 |
| 2002/0122666 | A1 | | 9/2002 | Miyazaki et al. |
| 2002/0191096 | A1 | * | 12/2002 | Tanaka et al. .......... 348/333.06 |
| 2003/0026611 | A1 | * | 2/2003 | Cho ........................... 396/332 |
| 2003/0112348 | A1 | * | 6/2003 | Okuley ................. 348/231.99 |
| 2004/0095473 | A1 | * | 5/2004 | Park ........................ 348/220.1 |
| 2004/0165106 | A1 | * | 8/2004 | Nakagawa .................. 348/373 |
| 2004/0223080 | A1 | * | 11/2004 | Kim ........................... 348/375 |
| 2005/0018067 | A1 | * | 1/2005 | Lee ....................... 348/333.06 |
| 2005/0146623 | A1 | * | 7/2005 | Juen ........................ 348/220.1 |
| 2005/0200718 | A1 | * | 9/2005 | Lee ......................... 348/220.1 |
| 2007/0025713 | A1 | * | 2/2007 | Hosono ....................... 396/72 |
| 2007/0070204 | A1 | * | 3/2007 | Mentzer ................ 348/207.99 |

FOREIGN PATENT DOCUMENTS

| | | |
|---|---|---|
| EP | 0 581 286 | 2/1994 |
| EP | 0 708 557 | 4/1996 |
| JP | 8-9204 | 1/1996 |
| JP | 8-149354 | 6/1996 |
| JP | 8-340469 | 12/1996 |
| JP | 2001-248629 | 9/2001 |
| JP | 2002-94862 | 3/2002 |
| KR | 1997-0072971 | 11/1997 |
| KR | 2000-0003088 | 1/2000 |

OTHER PUBLICATIONS

Japanese Office Action issued on Nov. 7, 2006 with respect to Japanese Application No. 2003-350037, which corresponds to the above-referenced application.

Korean Office Action issued with respect to Korean Patent Application No. 10-2003-0001151, which corresponds to the above-referenced application.

* cited by examiner

IMAGE PHOTOGRAPHING APPARATUS HAVING PHOTOGRAPHIC MODE BASED ON POSITION OF CAMERA UNIT

CROSS-REFERENCE TO RELATED APPLICATIONS

This application claims the benefit of U.S. application Ser. No. 60/464,094, filed Apr. 21, 2003 in the U.S. Patent and Trademark Office, and Korean Patent Application No. 2002-61573, filed Oct. 9, 2002, and Korean Patent Application No. 2003-1151, filed Jan. 8, 2003, the disclosures of which are incorporated herein by reference.

BACKGROUND OF THE INVENTION

1. Field of the Invention

The present invention relates to an image photographing apparatus, and more particularly, to an image photographing apparatus that unites the functions of a digital still camera and a digital camcorder.

2. Description of the Related Art

In general, a digital still camera (DSC) converts images incident through a lens into digital signals and stores the digital signals in a recording medium such as a hard disc or a memory card. Thus, a photographed image is not recorded in a film but stored in the recording medium. Therefore, it is possible to directly input digital images into a computer without intervention of a scanner. Because the digital still camera is highly compatible with a personal computer (PC), it is simple and convenient to perform editing and correction, and it is possible to transmit photographed images if the camera is connected with an external computer. The digital still camera includes a lens device, a memory device, a signal modulation device, a display device, etc. However, the digital still camera is mainly used to photograph still images in light of the capacity of the recording medium. That is, the digital still camera is capable of photographing some images. However, it is substantially impossible to photograph for a long period of time by using the digital still camera. In particular, the digital still camera is practically improper to photograph, store and reproduce moving images because there is no way to record and reproduce sounds at the time of photographing and reproducing moving images. In order to compensate such a defect, recording/reproducing apparatuses to record into or reproduce from a recording medium such as camcorders have been widely spread.

The camcorders include a lens device, a signal conversion device, a deck device to record/reproduce photographed images, and a display device. The camcorders mainly use a cassette tape as a recording medium, and the cassette tape is mounted in the deck device to record the photographed images. In addition, the camcorders may be provided with a microphone device and a speaking device and are capable of photographing for one or more hours once the cassette tape is loaded. These types of camcorders have a function to photograph still images. However, because image quality is poorer than that of the digital still camera as described above, the camcorders are mainly used in photographing moving images. Furthermore, because the camcorders generally have many functions and have a complicated construction as compared to digital still cameras, the camcorders are relatively bulky and expensive.

In order to utilize all of the functions of the digital still camera and the camcorder as described above, both products are typically purchased. This may impose a heavy economic burden on consumers. Furthermore, it is also troublesome to the consumer to carry both products because they have individual characteristic functions, which may impose a physical burden.

SUMMARY OF THE INVENTION

Accordingly, it is an aspect of the present invention to provide an image photographing apparatus to unite the functions of a digital still camera and digital camcorder.

Additional aspects and/or advantages of the invention will be set forth in part in the description which follows and, in part, will be obvious from the description, or may be learned by practice of the invention.

The foregoing and/or other aspects of the present invention are achieved by providing an image photographing apparatus including a body, on which a tape cassette is removably mounted, and a camera unit installed in the body and provided with a plurality of camera sections having pixel numbers and independently driven. The image photographing apparatus also includes a mode sensing unit to sense a photographic mode corresponding to at least one of the camera sections, and a control unit to select a photographic mode according to a signal transferred from the mode sensing unit and to drive the camera unit to correspond to the selected photographic mode. The image photographing apparatus includes a display unit provided in the body to show an image photographed by the at least one camera section.

BRIEF DESCRIPTION OF THE DRAWINGS

The above and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
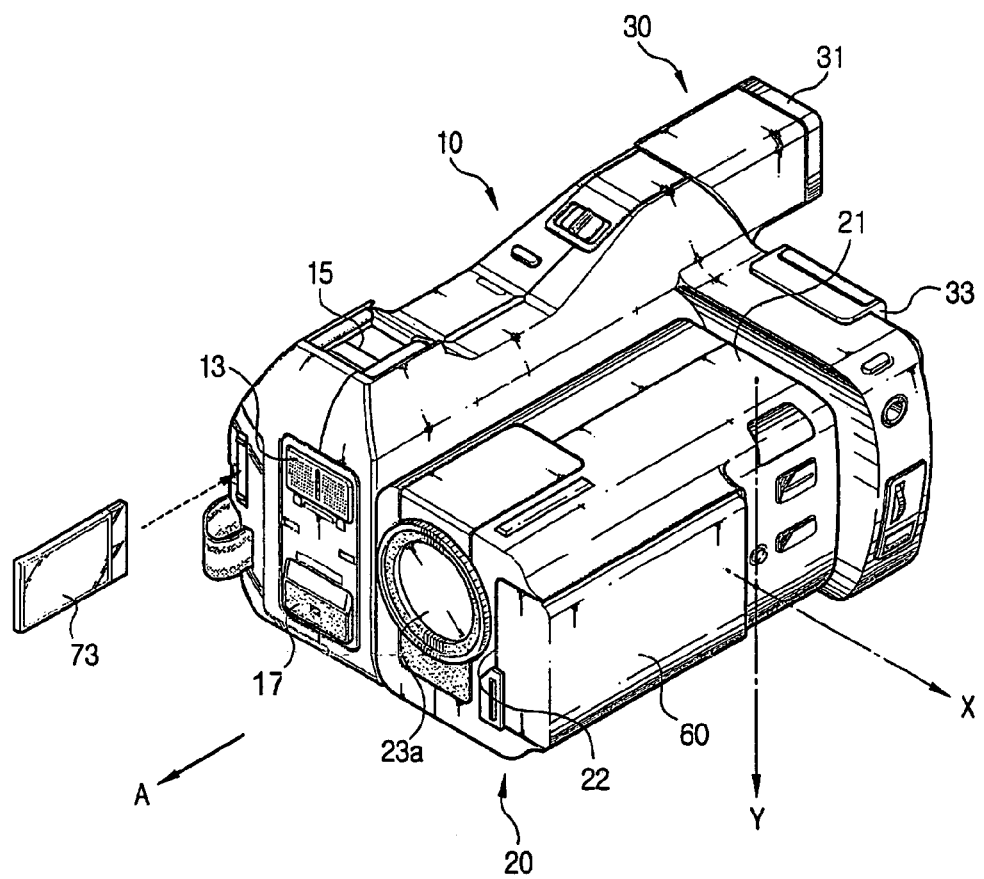
FIG. 1 is a perspective view of an image photographing apparatus, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
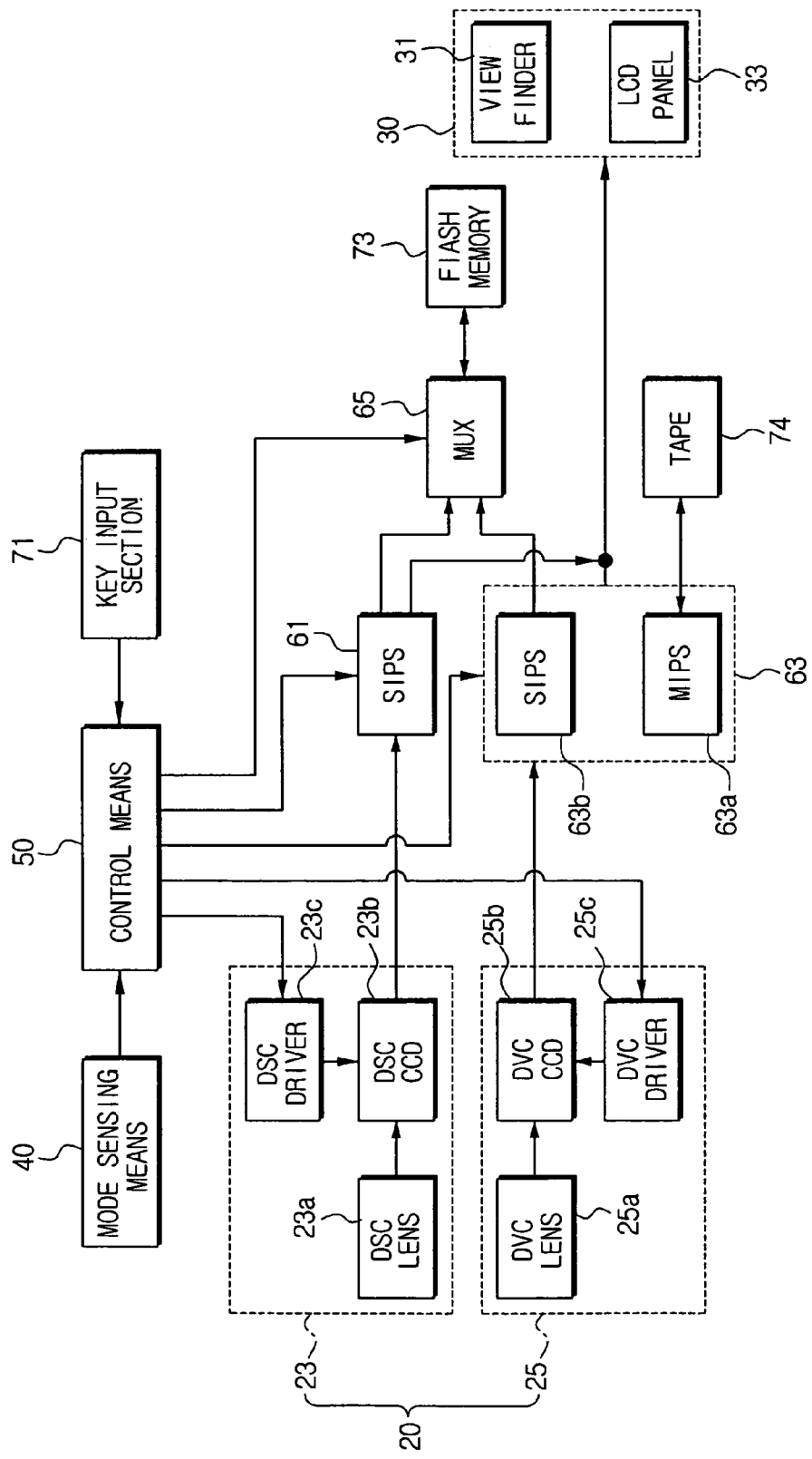
FIG. 2 is a block diagram illustrating the image photographing apparatus of FIG. 1.

Referring to FIGS. 1 and 2, the image photographing apparatus, according to an embodiment of the present invention has both functions of a digital still camera and a camcorder. The image photographing apparatus includes a body 10, a camera unit 20 connected to the body 10, a display unit 30 provided in the body 10, a mode sensing unit 40 and a control unit 50.

Figure 3:
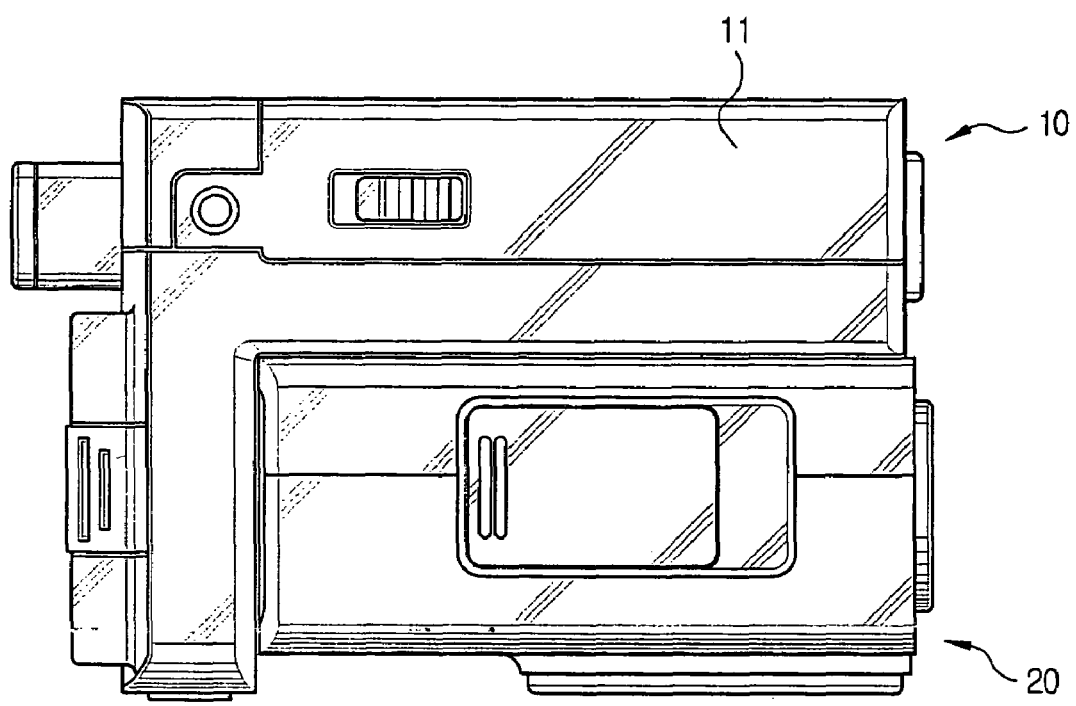
FIG. 3 is a bottom view of the image photographing apparatus shown in FIG. 1.

The body 10 has a "]" shape as shown in a top plan view. An inside of the body 10 is provided with a moving deck into which a cassette tape is removably installed to record moving images. That is, a deck door 11 is provided in a bottom side of the body 10 to open and shut, as shown in FIG. 3, and the cassette tape is installed in the moving deck through the deck door 11. As shown by phantom lines in FIG. 4, the deck door 11 allows the cassette tape to be installed in the moving deck when a lower side of the body 10 is opened. Operations of the deck door 11 and the moving deck 12 are substantially identical to those applied to conventional camcorders and thus, a detailed description thereof is omitted. One end of the body 10, i.e., a rear end of the body 10 exposed toward a photographing direction, is provided with a speaker unit 13 to output reproduced sounds and a microphone unit 17 to capture external sounds. An accessory mount section 15 is provided on a top surface of the body 10 to mount an accessory such as a flash.

Figure 4:
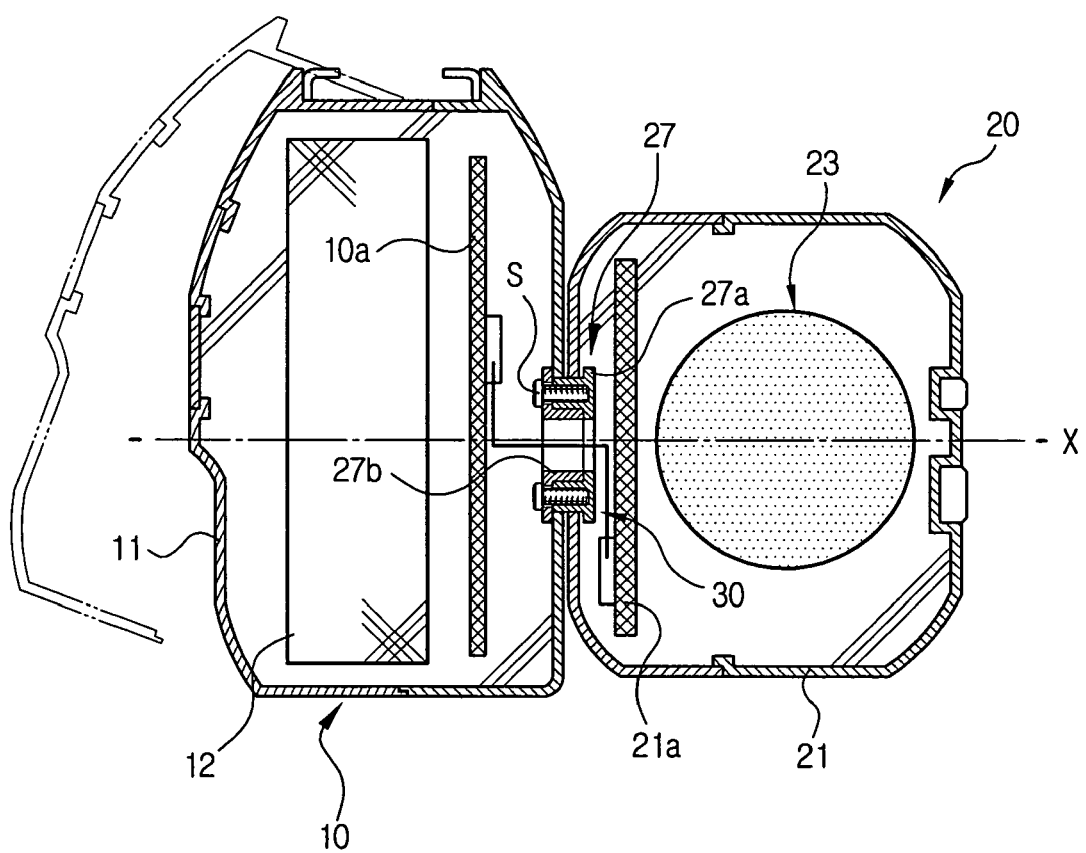
FIG. 4 is a schematic cross-sectional view of the image photographing apparatus shown in FIG. 1.

The camera unit 20 includes a housing 21 movably mounted on the body 10 and a plurality of camera sections, which have different pixel numbers. The housing 21 is rotatably connected to the body 10 via a hinge section 27, as shown in FIG. 4. That is, the housing 21 is connected to a side of the body 10 in such a way that the housing 21 is rotatable over an angle of at least 180° and returned to its origin about the rotational axis. The housing 21 is also provided with a battery mount section 22, in which a battery 60 is removably installed. The battery 60 may be mounted in the battery mount section 22 from an end of the housing 21 by a sliding manner.

The camera sections include a first camera section 23 used for the digital still camera and a second camera section 25 used for a digital video camera to pick up images including moving images, in which a pixel number of the second camera section 25 is smaller than that of the first camera section 23.

The first camera section 23 includes a first lens 23a, a first CCD 23b to convert still images picked up through the first lens 23a into electric signals, and a first driver 23c to drive the first CCD 23b. The first driver 23c is controlled by the control unit 50. Specifically, if a mode is determined to photograph still images, the control unit 50 controls the first driver 23c so that the first CCD 23b is driven. The first camera section 23 is identical to the conventional digital still cameras and thus, a detailed description thereof is omitted.

The second camera section 25 includes a second lens 25a, a second CCD 25b to convert still images picked up through the second lens 25a into electric signals, and a second driver 25c to drive the second CCD 25b while being controlled by the control unit 50. In a moving image photographic mode or in a still image photographic mode operated by the second camera section 25, the control unit 50 controls the second driver 25c so that the second CCD 25b is driven. The second camera section 25 has a construction applied to the conventional digital video cameras (e.g., camcorders) and thus, a detailed description thereof is omitted.

Figure 5:
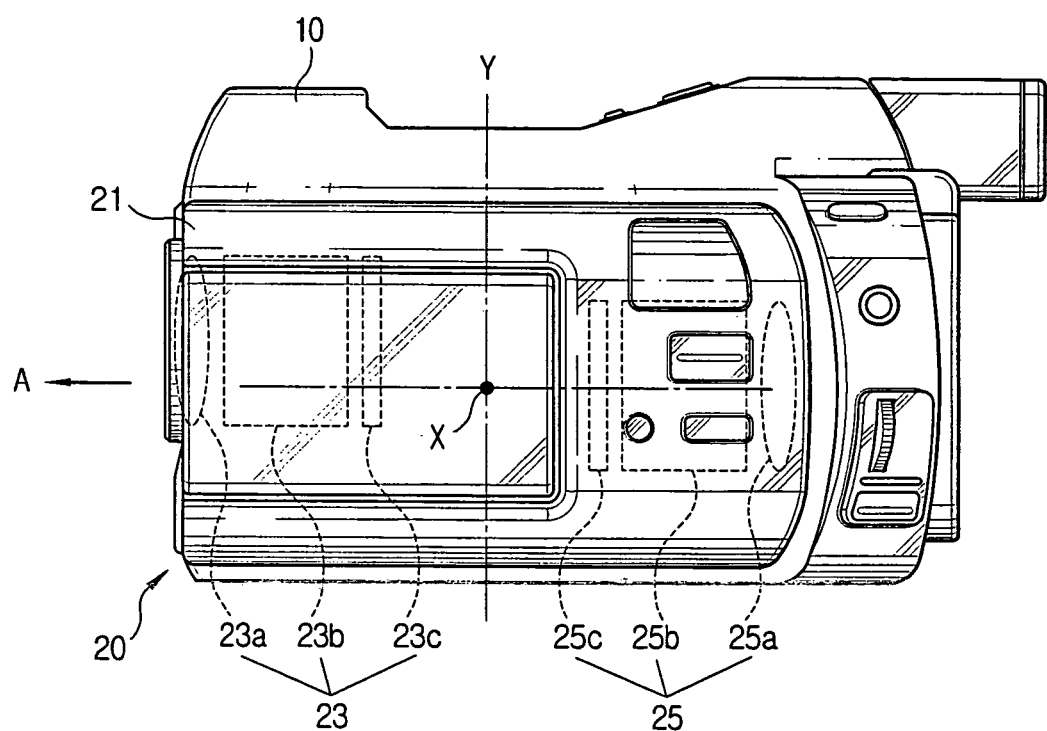
FIG. 5 is a side view of the image photographing apparatus shown in FIG. 1.

Meanwhile, the first and second camera sections 23, 25 are preferably positioned on a same line in the housing 21 and the image picking up directions thereof are oppositely oriented. Therefore, if the first lens 23a of the first camera section 23 is installed to be exposed from one end of the housing 21 as shown in FIG. 1, the second lens 25b of the second camera section 25 is installed to be exposed at the other end of the housing 21. That is, as shown in FIG. 5, the first camera section 23 and the second camera section 25 are symmetrically located about a rotational axis X of the housing 21 in relation to the body 10. Accordingly, the first and second camera sections 23, 25 are located to maintain an angle of 180° between them and if the housing is rotated over 180°, their positions are changed with each other. If the corresponding mode of the first camera section 23 positioned toward a photographing direction A is determined to be used among the camera sections 23, 25, the first camera section 23 is driven and the second camera section 25 is maintained in an OFF state. The operational relation between the first and second camera sections 23, 25 will be described in more detail later.

Next, the hinge section 27 to connect the housing 21 to be rotated in relation to the body 10 includes a first hollow shaft 27a rotatably installed in the housing 21, and a second hollow shaft 27b rotatably installed in the body 10 and engaged with the first hollow shaft 27a. That is, the first shaft 27a is inserted into a hole provided in a side surface of the housing 21 facing the body 10. The first shaft 27a has a flange larger than the hole of the housing 21 and the flange is positioned inside of the housing 21. Therefore, the first shaft 27a cannot be extracted from the housing 21 through the hole. The second shaft 27b is inserted into a hole provided in the body 10. The second shaft 27b also has a flange larger than the hole of the body 10 and the flange is positioned inside of the body 10. And the first and second shafts 27a, 27b are interconnected by a screw S. Therefore, the body 10 and the housing 21 are connected to be rotatable relative to each other by the connection of the shafts 27a, 27b. That is, the housing 21 is rotatable in relation to the body 10 about the shafts 27a, 27b. Furthermore, because central parts of the shafts 27a, 27b are hollow, various cables for signal transfer, electric power supply, etc., between the body 10 and the housing 21 pass through empty spaces within the shafts 27a, 27b. Preferably, if a main circuit board 10a is provided within the body 10 and a sub circuit board 21a is provided within the housing 21, it is possible to directly connect these boards with a signal cable such as an FPC. In this case, the FPC may be freely deformed and restored to its origin at least within a rotation range of the housing, thereby enabling signal transfer.

Figure 6:
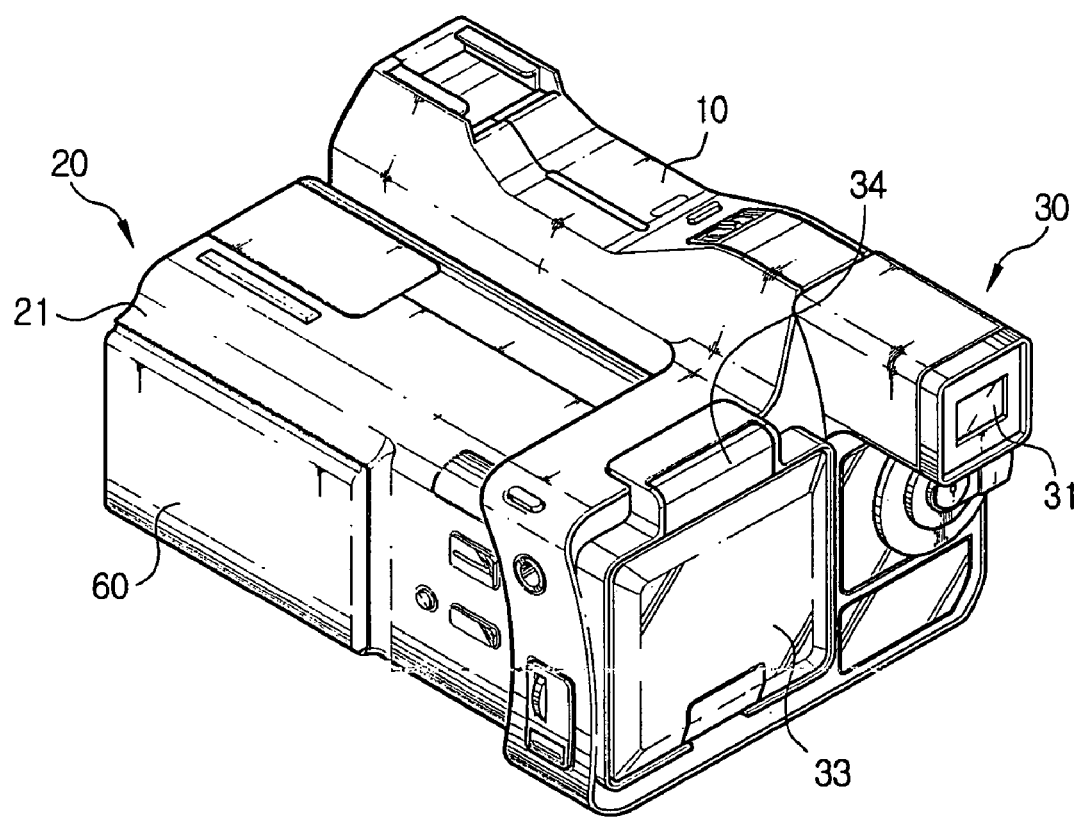
FIG. 6 is a perspective view of an image photographing apparatus, according to another embodiment of the present invention.

The display unit 30 includes a viewfinder 31 provided in the body 10 to display images picked up via the camera sections 23, 25, and an LCD panel 33 provided in the body 10, as shown in FIG. 6. The viewfinder 31 is substantially identical to those provided in conventional camcorders in construction and function and thus, a detailed description thereof is omitted.

Figure 7:
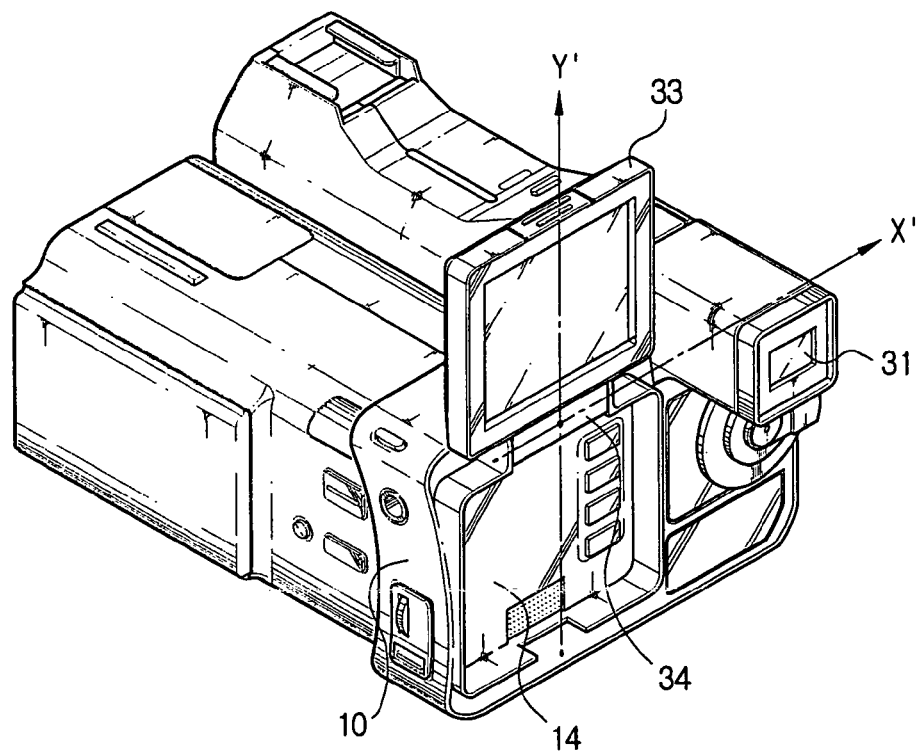
FIGS. 7 and 8 are perspective views of the image photographing apparatus, in which the LCD panel is opened from the state of FIG. 6, respectively.
Figure 8:
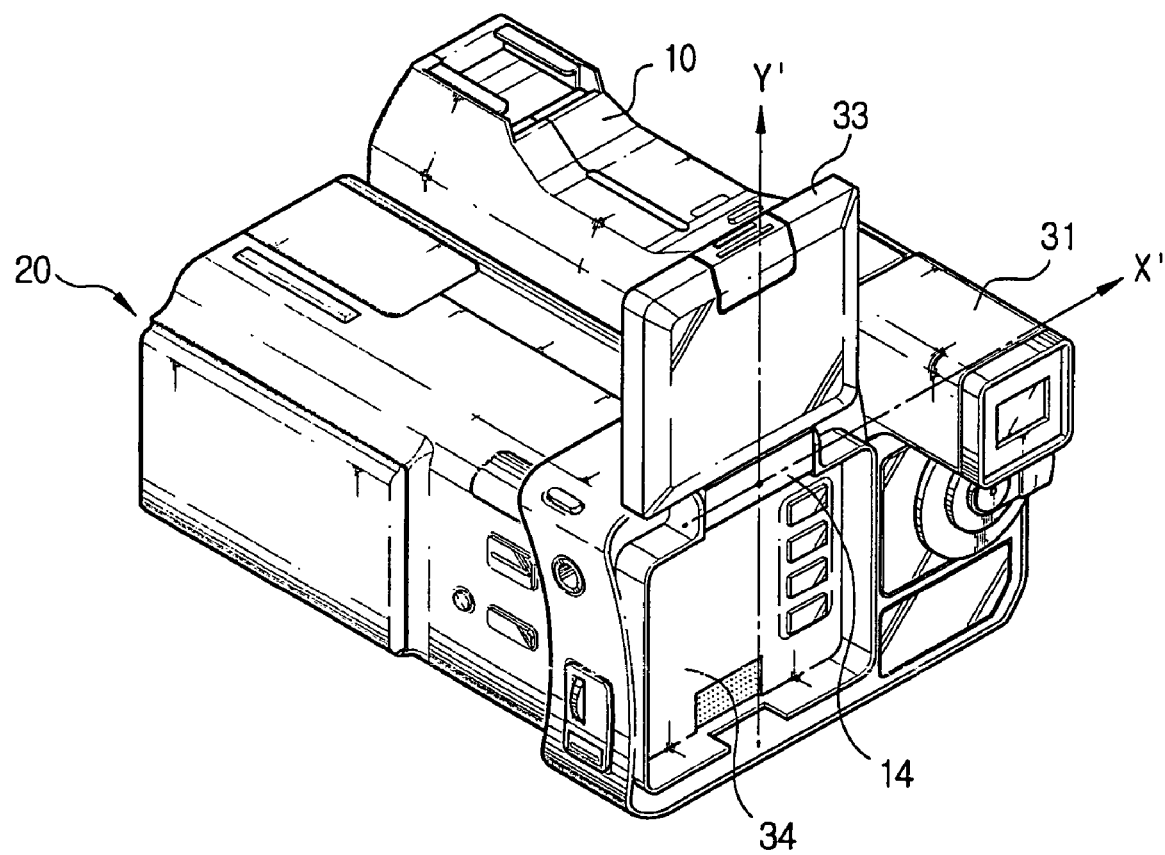

The LCD panel 33 is seated on a seating section provided in the front face of the body 10, as shown in FIG. 7. The LCD panel 33 is rotatably connected, for example, to an upper end of a seating section 14 by a joint 34, thereby allowing the seating section 14 to be opened and closed. The joint 34 supports the LCD panel 33 so that the LCD panel 33 is rotatable about two axes X', Y'. Therefore, the LCD panel 33 is rotatable about the Y' axis from an opened state as indicated in FIG. 7, and FIG. 8. In this case, a user may confirm the photographed state through the LCD panel 33 while photographing his/her own appearance. To the contrary, it is also possible that a person being photographed confirm his/her own photographed state through the LCD panel 33 while the photographer confirms the photographed state through the viewfinder 31.

Figure 9:
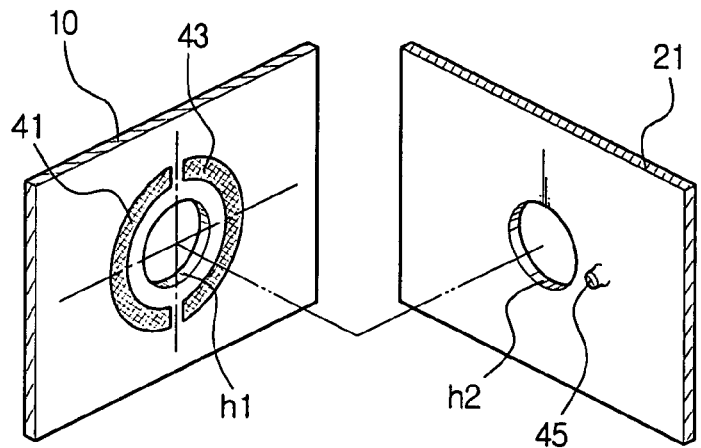
FIG. 9 is a schematic perspective view illustrating a selector switch by way of an example of a mode sensing device shown in FIG. 2.
Figure 10:
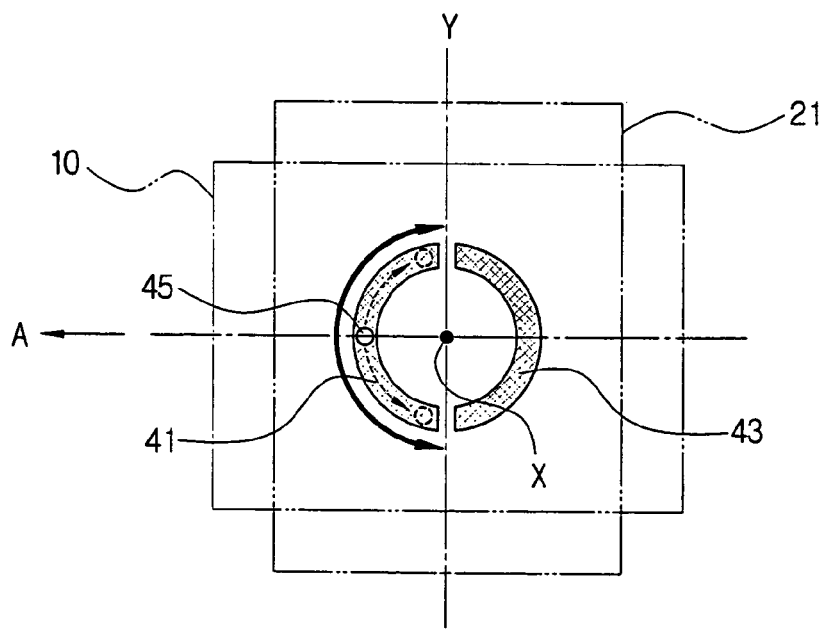
FIG. 10 is a view schematically showing a state in which a first camera section is turned ON by a selector switch shown in FIG. 9.

The mode sensing unit 40 is provided to sense a photographing position among the camera sections 23, 25 and consequently to sense a photographic mode thereof. That is, the mode sensing unit 40 senses the photographic mode corresponding to one of the first and second camera sections 23, 25 according to the rotated angle of the camera unit 20 in relation to the body 10. The camera sections 23, 25 are symmetrically located to maintain an angle of 180° between them as described above, and the mode sensing unit 40 senses the photographic mode at about 180°. The mode sensing unit 40 preferably includes a selector switch that turns ON one of the camera sections 23, 25 and turns OFF the other. For example, the selector switch may be constructed to include first and second contact patterns 41, 43 provided on the body 10 and a contact terminal 45 provided on the housing 21 to be connected to one of the contact patterns 41, 43, as shown in FIG. 9. In the above construction, the body 10 and the housing 21 are connected to be relatively rotatable with each other opposite to holes h1, h2, respectively. Therefore, the contact terminal 45 comes into contact with the first contact pattern 41 or the second contact pattern 43 according to the rotated angle of the housing 21. Here, it may be assumed that the first contact pattern 41 is connected to the first camera section 23 and the second contact pattern 43 is connected to the second camera section 25. As such, if the contact terminal 45 is positioned to come into contact with the first contact pattern 41, the first camera section 23 is turned to the ON state and the second camera section 25 is turned to the OFF state, as shown in FIG. 10, and the control section 50 determines the photographic mode of still images corresponding to the first camera section 23. In this case, the first and second contact patterns 41, 43 are provided to be capable of coming into contact with the contact terminal 45 over an angle of about 180°. Therefore, any of the first and second camera sections 23 and 25 are capable of being driven all around the rotation angle of the housing 21 and the camera unit 20 in relation to the body 10. Preferably, in FIG. 10, the camera unit 20 positioned on the left side with reference to Y-axis is capable of being driven all around the angle included in that position. Therefore, the first and second camera sections 23, 25 are changed to ON/OFF states with reference to the Y-axis by the selector switch.

The control unit 50 selects a photographic mode according to a signal transferred from the mode sensing unit 40, i.e., the selector switch operating as described above, and drives the camera unit 20 to correspond to the selected photographic mode. The control unit 50 is set with predetermined control data via a key input section 71. The control unit 50 selectively drives a first image processing section 61 that processes signals transferred from the first camera section 23, or a second image processing section 63 that processes signals transferred from the second camera section 25 according to the selected photographic mode. That is, the first image processing section 61 compresses and stores one or more still images photographed by the first camera section 23 in a flash memory 73, and then processes them into signals capable of being displayed through the display unit 30. In addition, the second image processing section 63 is subdivided into a moving images processing section 63a that processes moving images photographed by the second camera section 25 and a still images processing section 63b that processes still images photographed by the second camera section 25. The moving image processing section 63a processes and stores inputted moving images in a tape 74 and compressively processes the moving images into signals capable of being displayed through the display unit 30. Furthermore, the still image processing section 63b stores inputted still image signals in the flash memory 73 and compressively processes the still image signals into signals capable of being displayed.

Meanwhile, the signals processed in each of the image processing sections 61, 63 are selectively adopted in a MUX 65 and stored in the flash memory 73. The MUX 65 is controlled by the control unit 50, so that the MUX 65 may be driven to select the signals transferred from the camera unit 20 to correspond to the selected photographic mode. The MUX 65 may also be controlled in such a manner that it remains in the OFF state in cooperation with the selector of the mode sensing unit 40 when the first camera section 23 is turned OFF, while it remains in the ON state when the first camera section 23 is turned OFF.

Operations of the image photographing apparatus having the afore-mentioned constructions will be described in detail below.

Firstly, a power switch provided on any one of the body 10 and the housing 21 of FIG. 1 is turned ON. Then, the mode sensing unit 40, i.e., the selector switch, turns ON one of the first and second cameras 23, 25 and turns OFF the other. For example, in a state as shown in FIG. 5, the first camera section 23 oriented toward the photographing direction A is turned ON and the second camera section 25 is turned OFF. Information regarding ON/OFF states of the camera sections 23, 25 is transferred from the selector switch to the control unit 50. The control unit 50 selects the still image photographic mode corresponding to the first camera section 23, i.e., the digital still camera mode, as the mode to be played according to the transferred information.

If a photographic command is inputted via the key input section 71 from the above state, the control unit 50 controls the first driver 23c to drive the first CCD 23b. Then, the still image picked up through the first lens 23a is converted into electric signals in the first CCD 23b. The converted electric signals are compressively compressed into a form appropriate to be stored in the flash memory 73 by the still image processing section 61. The compressively processed still image signals are stored on the flash memory 73 via the MUX 65 and displayed through the viewfinder 31 or the LCD panel 33 in real time. Digital signals compressed by the selected operation of the key input section 71 are either transferred to a PC through a USB port or stored in an auxiliary memory unit.

Figure 11:
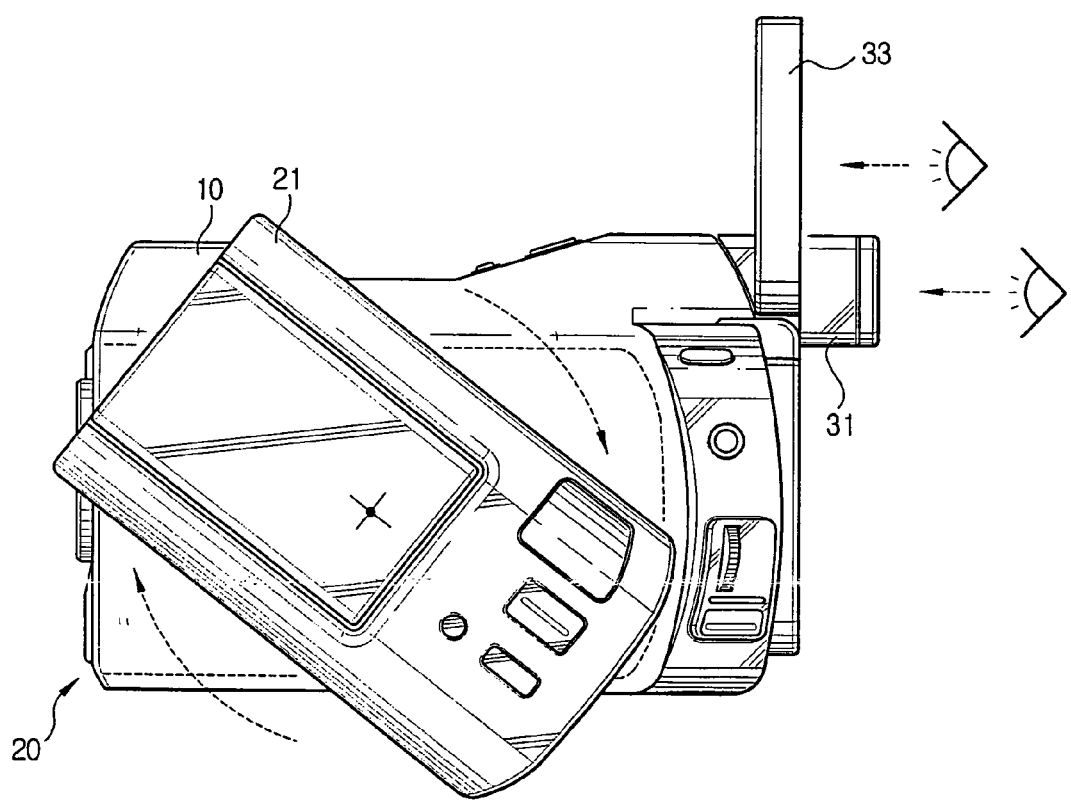
FIG. 11 is a side view illustrating a state in which still images are photographed by using the image photographing apparatus.

In addition, the first camera section 21 remains in an ON state even if the camera unit 20 is additionally rotated by a predetermined angle in relation to the body 10, as shown in FIG. 11. Therefore, the user may freely photograph in an upwardly or downwardly tilted angle while viewing photographed images through the viewfinder 31 or the LCD panel 33 even if the body 10 takes a predetermined posture, i.e., the body 10 is maintained in a conveniently gripped state. As described with reference to FIG. 10, because the first camera section 23 remains in the ON state within the range of 180° of the left section in relation to Y-axis, it is possible to photograph while freely rotating the housing 21 within that range.

Figure 12:
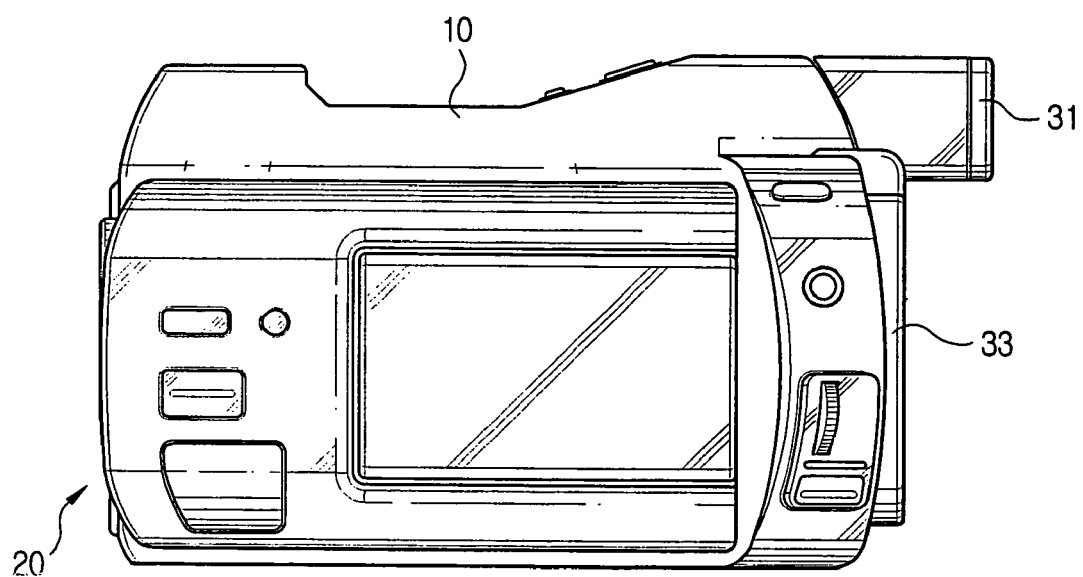
FIG. 12 is a side view illustrating a state in which moving images are photographed by using the image photographing apparatus.
Figure 13:
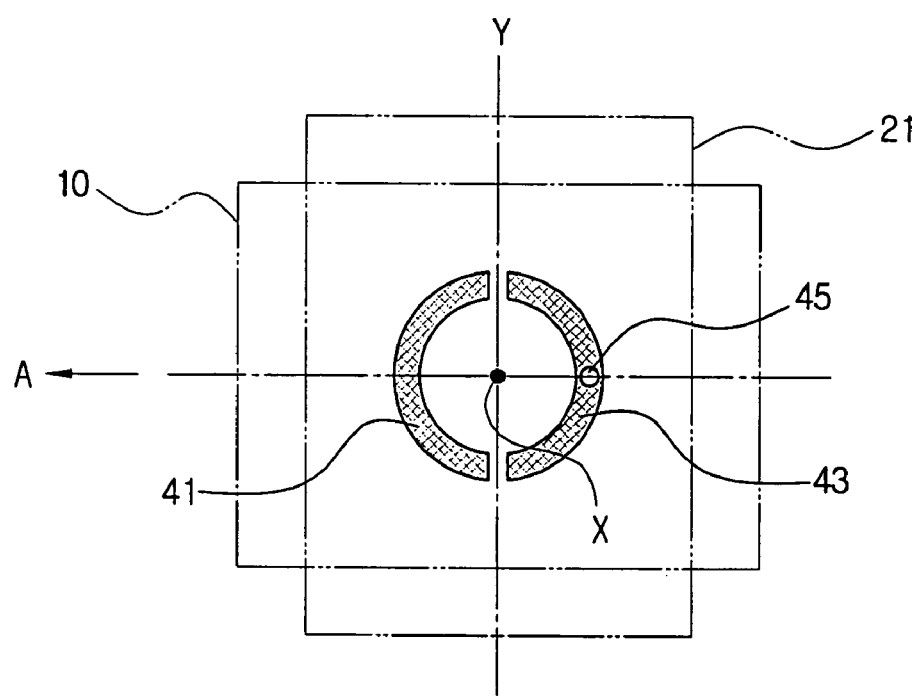
FIG. 13 is a view schematically showing the state in which a second camera section is turned ON by the selector switch shown in FIG. 9.

Meanwhile, if the user wishes to move images during photographing still images, the user may rotate the camera unit 20 from the state shown in FIG. 11 to the state shown in FIG. 12. Then, as shown in FIG. 13, the contact terminal 45 comes into contact with the second contact pattern 43. Therefore, the second camera section 25 is turned into the ON state and the camera unit 23 is turned into the OFF state. The control unit 50 turns over the photographing modes and thus, selects the moving image photographic mode to correspond to the second camera section 25 according to the signal transferred from the selector switch.

In the moving image photographing mode as described above, if a photographing command is inputted via the key input section 71, the control unit 50 controls the second driver 25c to drive the second CCD 25b. Then, the moving images picked up through the second lens 25a are converted into electric signals in the second CCD 25b. The converted electric signals are compressively processed into a form suitable to be stored in the tape 74 by the moving image processing section 63a. The compressively processed video signals are recorded in the tape 74 and displayed through the viewfinder 31 and the LCD panel 33 in real-time. Recorded video signals may be reproduced again and transported to a PC through a USB port.

In addition, it is possible to photograph still images by using the second camera section 25. In this case, the still images photographed by the second camera section 25 are transferred to the still image processing section 63b of the second image processing section 63 and then compressively processed into a form suitable to be stored in the flash memory 73.

As described above, the image photographing apparatus according to the present invention incorporates camera sections capable of photographing still images and/or moving images as one unit provided in the body 10 of the apparatus. The photographic mode is selected according to the rotated state of the camera unit 20 and the camera unit 20 corresponding to the photographable mode is driven, so that the moving images or still images may be photographed. Therefore, it is possible to unite a digital still camera and a camcorder that conventionally have been available as separate products. By uniting a digital still camera and a camcorder, it is possible to provide a product having the functions of both products at a price lower than a cost of purchasing both products to use the characteristics of each of the products.

Before, it was troublesome to separately carry two types of products each having individual functions. However, by uniting them into one product, there is an advantage in that it is convenient to carry the product and losing the product may be prevented.

In particular, there is an advantage in that it is possible to provide an economic and simplified product, because it becomes possible to use a single battery, a single tape and a single flash memory in order to use multiple photographing functions.

Meanwhile, in the above embodiments, although it is described by way of an example that the battery 60 is installed in the housing 21 and the flash memory 73 is mounted in the body 10, their positions may be changed. It is possible to change the designs and sizes of the body 10 and the housing 21.

Furthermore, the construction of the hinge section 27 is not limited to the construction as described in the above embodiments. Although not shown, it is possible to provide a rotational determination pattern on the housing 21 or the body 10 in order to allow a stepwise rotation of the housing 21. A proper frictional force is applied between the body 10 and the housing 21 in order to maintain the rotated state prior to a force being applied.

In the case of the mode sensing unit 40, it is also possible to sense the positions of the first and second camera sections 23, 25 only by using a non-contact sensor, e.g., a photo-sensor, and then the control unit 50 determines the sensed signals to select the photographic mode. Generally, the mode sensing unit may be embodied in various ways.

Figure 14:
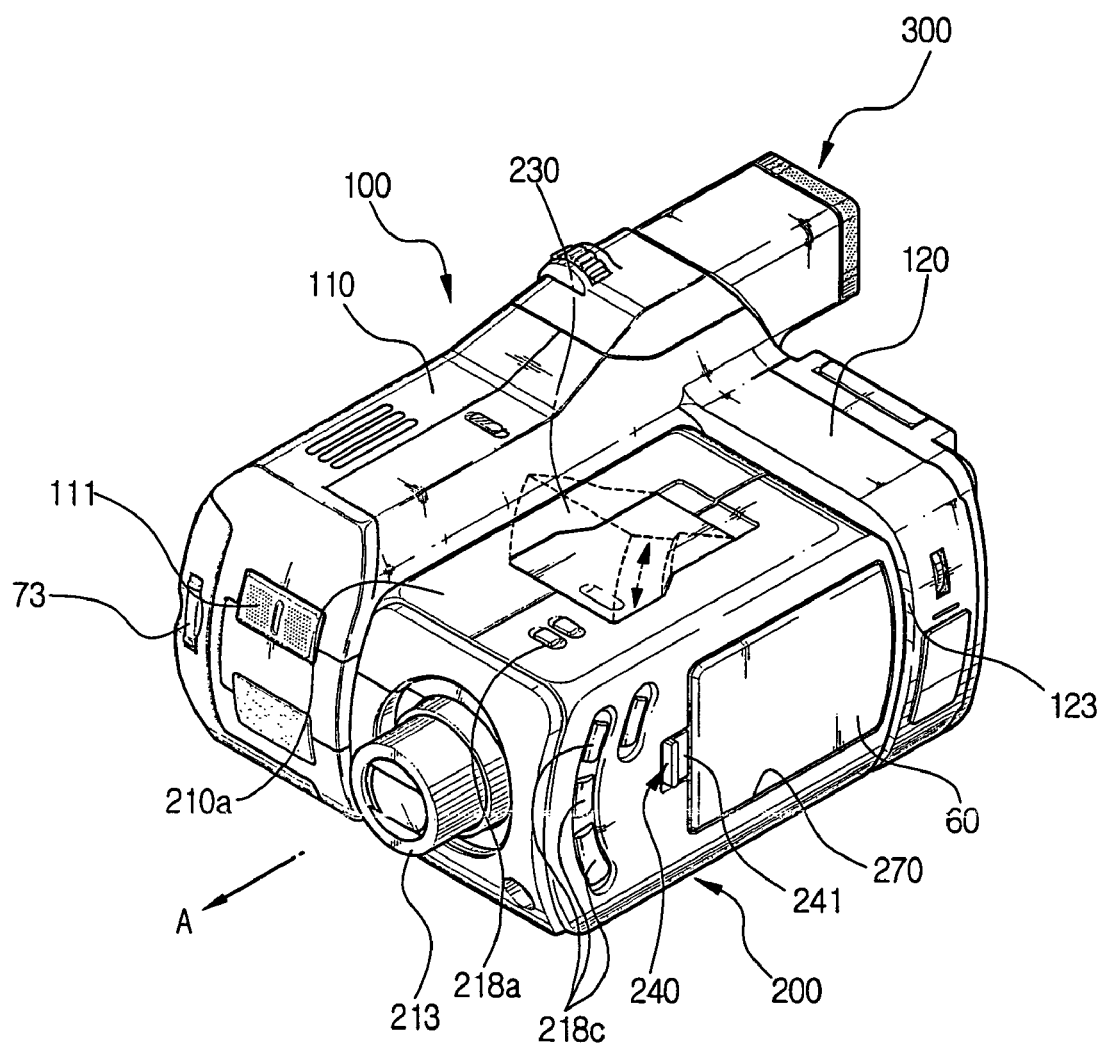
FIG. 14 is a perspective view of an image photographing apparatus, according to another embodiment of the present invention.

Referring to FIG. 14, the image photographing apparatus according to another embodiment of the present invention includes a body 100 having an inside which is provided with a moving deck installed with a tape cassette, a camera unit 200 mounted to be rotatable in relation to the body 10, a display unit 100, a mode sensing unit, a control unit, etc. In this embodiment, the constructions of the mode sensing unit 40 and control unit 50 are identical to those described with reference to FIGS. 1 and 2, and thus, the detailed description thereof is omitted.

Figure 15:
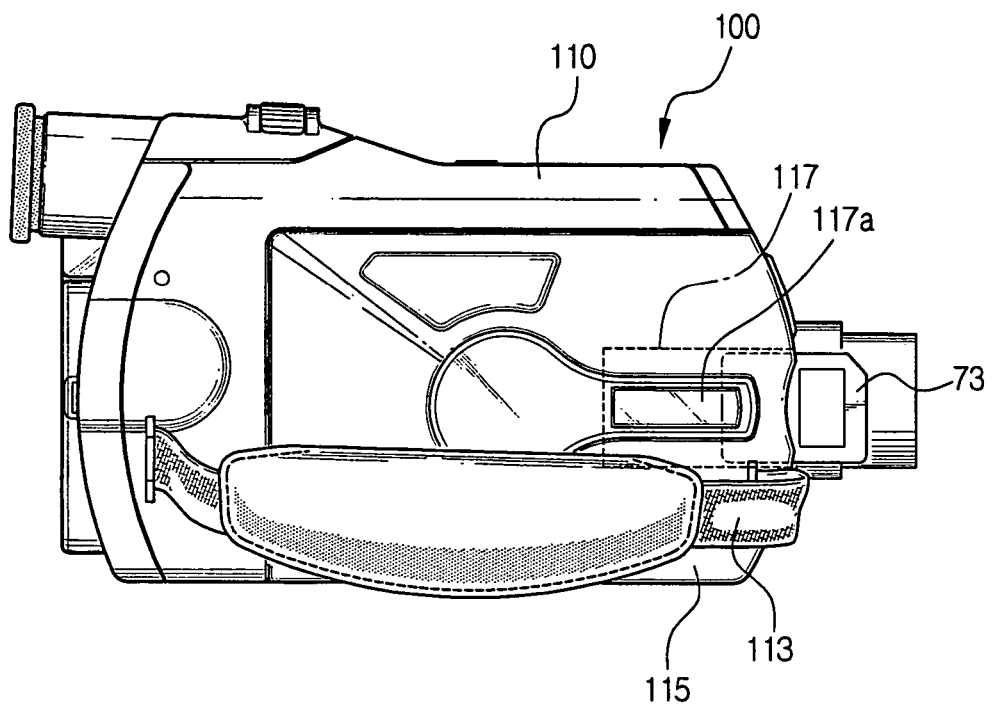
FIG. 15 is a right side view of the image photographing apparatus shown in FIG. 14.
Figure 16:
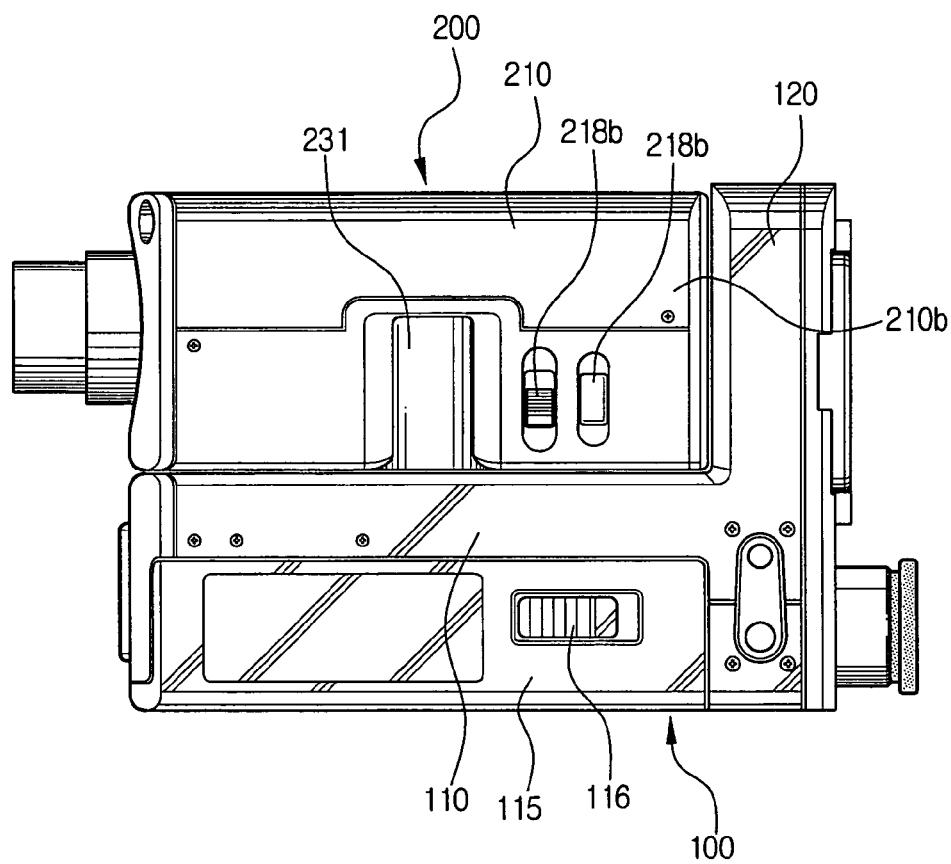
FIG. 16 is a bottom view of the image photographing apparatus shown in FIG. 14.

The body 100 includes a main-body 110 provided with the moving deck, and a sub-body 120 projectedly provided on a side of the main-body 110. The rear end of the main-body 110, i.e., the end exposed in a photographing direction A is installed with a microphone unit 111 to acquire external sounds. As shown in FIG. 15, the main-body 110 is the part gripped by a hand of the user. A handle band 113 is provided in the part opposite to the area where the camera unit 200 is connected. In addition, a deck door 115 is installed to be capable of being opened downwardly and laterally so that a tape cassette may be inserted through a lower side of the main-body 110. Accordingly, a door open lever is provided on a bottom of the main-body 110 to open the deck door 115, as shown in FIG. 16. In addition, in the main-body 110, particularly in the deck door 115, is provided a flash memory mount section 117 in which a flash memory 73 is installed. The memory mount section 117 has a confirmation window 117a to confirm the mounting of the flash memory 73 from the outside. The confirmation window 117a may be provided by forming an opening or providing a transparent window over the memory mount section 117. In the present embodiment, the memory mount section 117 is provided on the memory deck 115.

Figure 17:
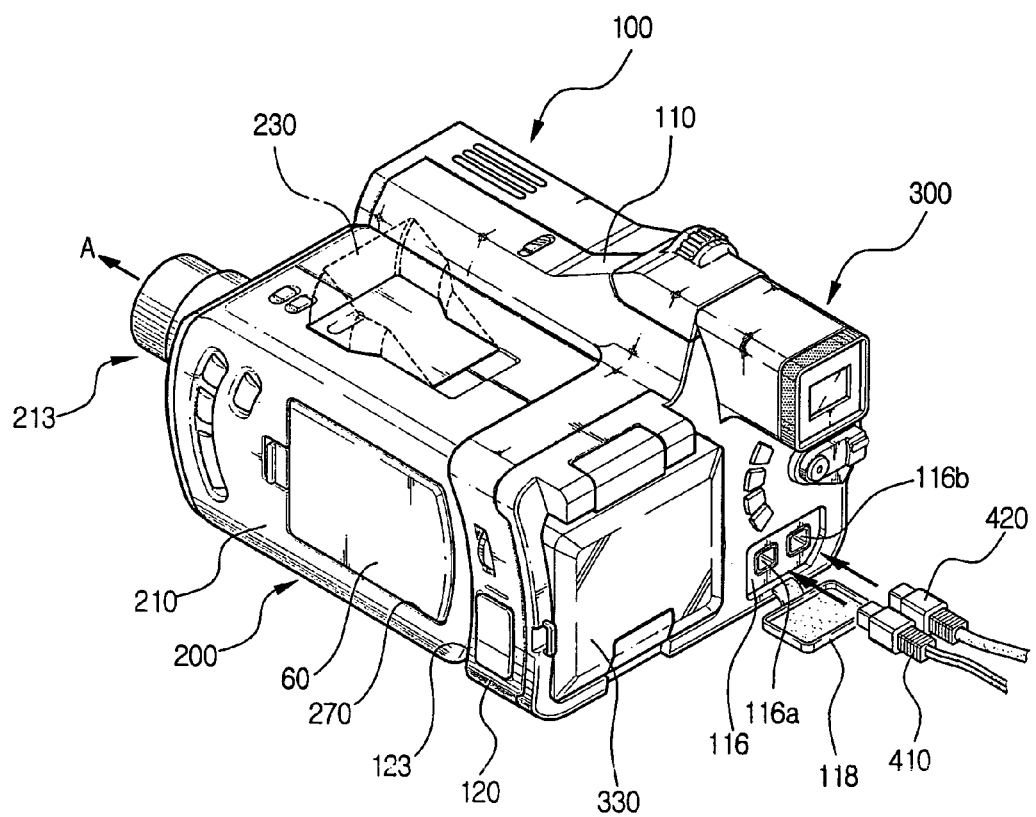
FIGS. 17 and 18 are perspective views illustrating operation states of an image photographing apparatus, according to another embodiment of the present invention, respectively.

Furthermore, in the front face of the main-body 110, there are provided buttons to manipulate various functions. Referring to FIG. 17, the front face of the main-body 110 is also provided with an electric power connector section 116a, to which a power supply cable 410 is connected, and a connector section 116 provided with a signal connection port 116b, to which a signal cable 420 is connected to transfer signals to an external machine. The connector section 116 is capable of being opened and closed by the cover 118. Therefore, after the cover 118 is opened, the respective cables 410, 420 are connected and it becomes possible to supply electric power to the body 100 and to transfer signals.

Figure 18:
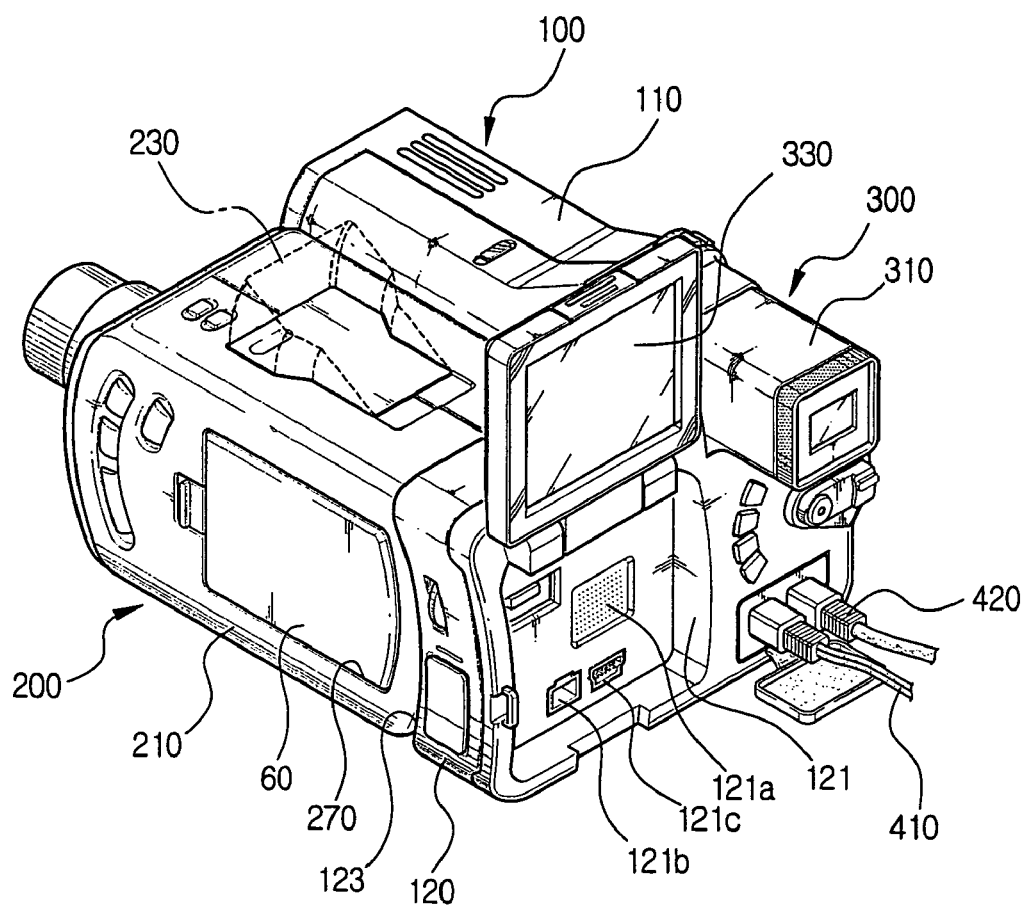

The sub-body 120 is projectingly provided on a side of the main-body 110 to form a single body with the main-body 110. The sub-body 120 supports a display panel 330 to be described later. The front face of the sub-body 120 is provided with a panel seating recess 121 within which the panel 330 is received and seated, as shown in FIG. 18. A bottom of the panel seating recess 121 is provided with a speaker unit 121a to output reproduced sounds. In addition, the panel seating recess 121 is provided with signal connection ports 121b, 121c to transfer signals. A rear face of the sub-body 120 is oppositely spaced from one end of the camera unit 200. Considering that the camera unit 200 is rotatably installed, the rear face of the sub-body 120 is provided in a concavely curved surface in order to prevent interference between the camera unit 200 and the sub-body 120 while minimizing the space between them.

The camera unit 200 includes a housing 210 having an inside of which is provided with a plurality of camera sections, and a hinge section 231 to rotatably connect the housing 210 to the body 100. The housing 210 is installed to be rotated at least 180° about the hinge section 231. The inside of the housing 210 is provided with a first camera section 213 used for a digital still camera and a second camera section 215 used for a digital video camera to photograph images including moving images. A pixel number of the second camera section 215 is smaller than that of the first camera section. The arrangement and construction of the first and second camera sections 213, 215 are identical to the camera sections 23, 25 described above with reference to FIGS. 2 and 5 and thus, the detailed description thereof is omitted. Meanwhile, the housing 210 has a substantially cuboid shape. Opposite ends of the housing 210, in which lenses 213a and 215a of the camera sections 213, 215, respectively, are exposed, have convexly curved surfaces 216, 217 curved to correspond to a concavely curved surface 123 of the sub-body 120. The convexly curved surfaces 216, 217 is spaced from a concavely curved surface 123 with a minimum space to avoid interference therebetween. More preferably, the curved surfaces 216, 217 and 123 have an identical center of curvature and the radii of curvature are different from each other. In addition, the center of curvature of the surfaces 216, 217 and 123 may be coincident with a rotational center X of the housing 210.

Figure 19:
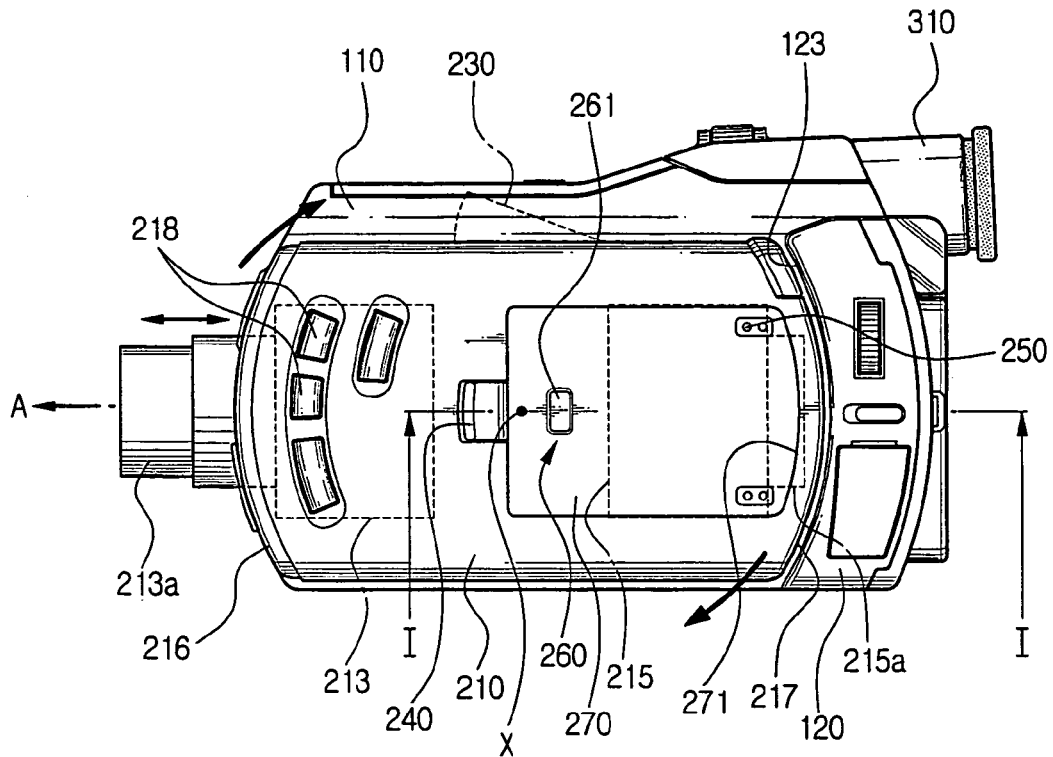
FIG. 19 is a left side view of the image photographing apparatus shown in FIG. 14.
Figure 20:
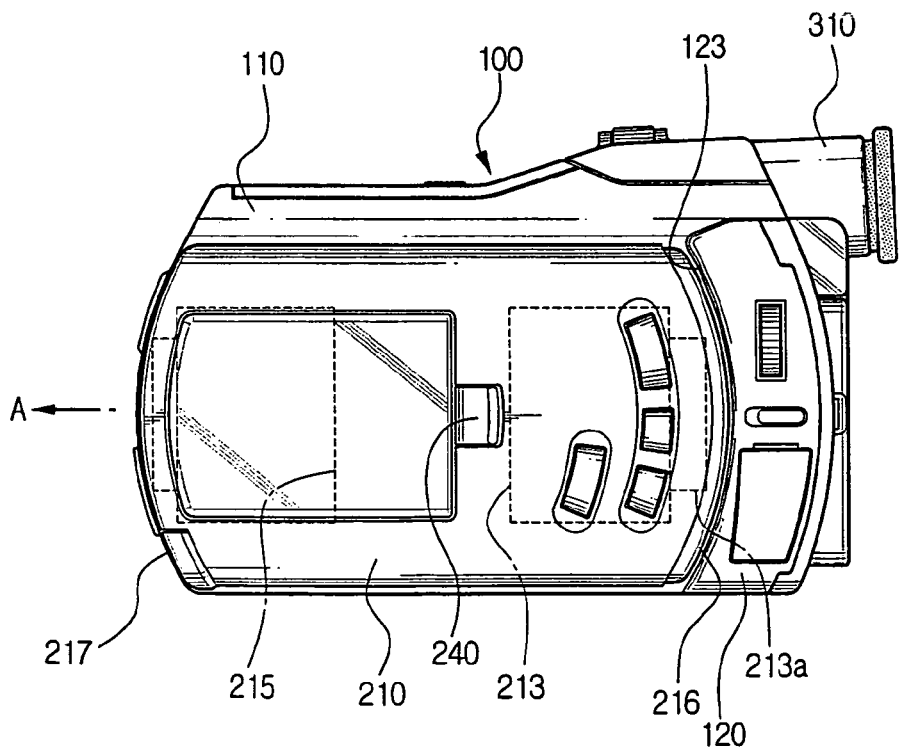
FIG. 20 is a left side view in which a housing is rotated 180° from the state of FIG. 19.

The state shown in FIG. 19 corresponds to the digital photographic mode to pick up still images through the first camera section 213, in which the still images are picked up through the zooming operation performed by the lens 213a popping in and out. From this state, the housing 210 is rotated 180°, as shown in FIG. 20, in order to execute video image photographing. Then, the lens 213a is retracted into the inside to the housing 210 in order to avoid interference with the sub-body 120 and the second camera section 215 is oriented to the photographing direction. The operations of the first and second camera sections 213, 215 and the operating conditions of the housing 210 are identical to the embodiments described with reference to FIGS. 1 to 13 and thus, the detailed description thereof is omitted here.

A flash unit 230 is installed on top of the housing 210 to pop out and in. In particular, the flash unit 230 is installed to emit light in the direction of photographing of the first camera section 213. The first camera section 213 may be supported on the housing 210 by a one-touch type switch that is widely used. In this case, the flash unit 230 is installed in such a way that it pops out if the top of the flash unit 230 is pressed once and pops in if the top of the flash unit 230 is pressed again when it is in the popping-out state.

In addition, a battery mount section 270 to mount a battery 60 is formed on a side of the housing 210. The battery mount section 270 is concavely formed to have a predetermined height with a shape to correspond to the shape of the battery 60. Therefore, the battery 60 is directly mounted in the battery mount section 270 (rather than in the sliding manner of the first embodiment described above). Here, the battery mount unit 270 is provided with a locking/release unit 240 to lock and release the battery 60. The locking/release unit 240 includes a sliding member 241 that is slidably mounted in the housing 210 and pops in and out of the battery mount section 270. The sliding member 241 is elastically biased by a spring (not shown) in a direction to be lockingly engaged with a predetermined portion of the battery 60.

Figure 21:
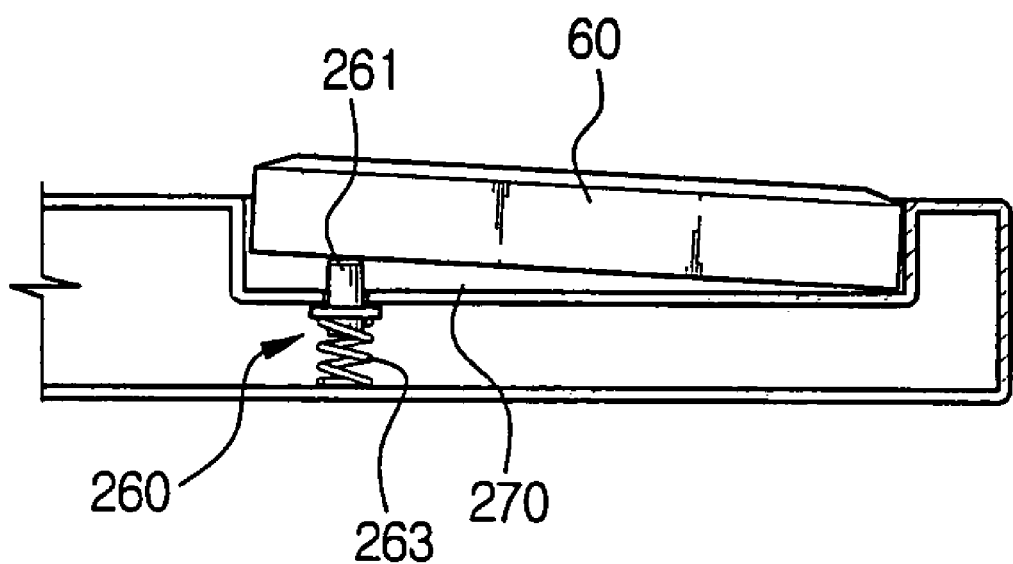
FIG. 21 is a cross-sectional view taken along line I-I of FIG. 19.

In addition, the bottom of the battery mount section 270 is provided with power terminals 250 and a detaching unit 260 to forcibly and outwardly detach the released battery. Referring to FIG. 21, the detaching unit 260 includes a compression projection 261 installed to pop in and out from a bottom of the battery mount section 270, and a spring 263 to elastically and outwardly compress the compression projection 261. Therefore, the released battery 60 is elastically pushed by the compression projection 261 being forcibly projected and thus, the battery 60 is projected from the battery mount section 270 by a predetermined distance, so that the battery 60 may be easily removed.

Here, the power terminals 250 and the locking/release unit 240 are oppositely positioned in the battery mount section 270. If the power terminals 250 are located as far as possible from the locking/release unit 240, the electric connection between the power terminals 250 and the battery 260 may be effectively implemented when the battery 60 is mounted in the battery mount section 270.

Furthermore, the detaching unit 260 is provided in the bottom of the battery mount section 270 to be positioned more adjacent to the locking/release unit 240. That is, the locking/release unit 240 and the detaching unit 260 may be positioned somewhat close to each other so that they will effectively exert forces in relation to the battery 60.

The battery mount section 270 has a concavely curved surface 271 having a radius of curvature. The concavely curved surface 271 is formed in a shape to correspond to that of the battery 60 to have a center of curvature identical to that of the curved surfaces 216, 217. Preferably, the concavely curved surface 271 takes the rotational center X of the housing 210 as the center of curvature like the curved surfaces 216, 217 and 123. In addition, the radii of curvature of the curved surfaces 123, 216, 217 and 271 are reduced in the order of the curved surface 123, the curved surfaces 216, 217 and the concavely curved surface 271.

In addition, the battery mount section 270 is installed to be offset to a side about the rotational center X of the housing 210. Preferably, the battery mount section 270 is installed to be offset toward the second camera section 215. This is because the second camera section 215 occupies a small space as compared to the first camera section 213 and thus, an extra space is reserved in the second camera section 215 side in the housing 210. Therefore, it is possible to design the internal space of the housing 210 compact while allowing the internal space to be effectively utilized.

Furthermore, the housing 210 is provided with a plurality of first manipulation buttons 218a to manipulate functions of the first camera section 213, a plurality of second manipulation buttons to manipulate functions of the second camera section 215 (see FIG. 16), and a plurality of third manipulation buttons 218c for common use. The first manipulation buttons 218b are exposedly provided on an operation position to be conveniently used in the still image photographing mode using the first camera section 213, i.e., on the first surface 210a of the housing 210 where the flash unit 230 is exposed. And, the second manipulation buttons 218b are provided on an operation position to be conveniently used in the moving image photographing mode using the second camera section 215. Thus the second manipulation buttons 218b are exposedly provided on the second surface 210b of the housing 210 to be upwardly exposed when the second camera section 215 is oriented toward the photographing direction. The third manipulation buttons 218c are installed to be exposed to a side of the housing 210 so that they may be commonly used regardless of the respective operations of the first and second camera sections 213, 215.

The display unit 300 includes a viewfinder 310 mounted on the main-body 110 and a display panel 330 mounted on the sub-body 120. Particularly, the viewfinder 310 is mounted on the top of the front face to the main-body 110 and the viewfinder 310 displays images picked up by at least one of the camera sections 213, 215 or reproduced images.

The display panel 330 is installed to be rotatable about two axes transverse in the sub-body 120. The construction of the display panel 330 is identical to that of the display 33 as shown in FIG. 1 and thus, the detailed description is omitted.

As described above, it is possible to selectively use individual functions of a digital still camera and a digital video camera (camcorder) by uniting the digital still camera and the digital video camera. Therefore, it is possible to provide a product having functions of both cameras with a low cost as compared to the prior art.

Furthermore, the product may be made to be compact, light-weight and convenient to carry even if functions of both cameras are united because a battery, a memory device, etc., may be commonly used.

In addition, there is an advantage in that a photographer may photograph with convenience because it is possible to photograph while rotating the camera unit only.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image photographing apparatus, comprising:
a body, on which a tape cassette is removably mounted;
a camera unit installed in the body and provided with a plurality of camera sections having pixel numbers and independently driven;
a mode sensing unit to sense a photographic mode to correspond to at least one of the camera sections;
a control unit to select a photographic mode according to a signal transferred from the mode sensing unit and to drive the camera unit to correspond to the selected photographic mode; and
a display unit provided in the body to show an image photographed by the at least one camera section,
wherein the camera unit comprises a housing to receive the camera sections to be oppositely directed on a same line.

2. The apparatus according to claim 1, wherein the camera unit is installed in the body to be rotatable in relation to the body, and the photographic mode sensed by the mode sensing unit is determined according to a rotated angle of the camera unit.

3. The apparatus according to claim 2, wherein when the camera unit rotates, the mode sensing unit senses photographic modes corresponding to the camera sections in reference to an angle of 180°.

4. The apparatus according to claim 1, wherein the camera sections comprise:
a first camera section used as a digital still camera to photograph still images; and
a second camera section used as a digital video camera to photograph images including moving images, wherein the second camera section has a pixel number lower than a pixel number of the first camera section.

5. The apparatus according to claim 4, wherein the first camera section comprises:
a first lens for a digital still camera;
a first CCD for the digital still camera, which converts at least one still image imaged by the first lens into electric signals; and
a first driver controlled by the control unit to drive the first CCD.

6. The apparatus according to claim 4, wherein the second camera section comprises:
a second lens for a digital video camera;
a second CCD for the digital video camera, which converts at least one moving image picked up by the second lens into electric signals; and
a second driver controlled by the control unit to drive the second CCD.

7. The apparatus according to claim 4, wherein the camera unit comprises:
a flash unit to emit light in a direction that the first camera section photographs.

8. The apparatus according to claim 1, wherein the body comprises:
a microphone unit to receive external acoustic signals; and
a speaker unit to send out recorded sounds.

9. The apparatus according to claim 1, wherein the mode sensing unit comprises:
a selector switch which turns ON one of the camera sections and turns OFF the other, and senses the photographic mode corresponding to the camera unit turned ON by the selector switch.

10. The apparatus according to claim 9, wherein when the camera unit rotates in relation to the body, and the selector switch turns ON the camera unit located within the predetermined range of the rotated angle of the camera unit and turns OFF the remainder.

11. The apparatus according to claim 1, wherein the display unit comprises:
a viewfinder provided in the body to show images photographed by the camera sections; and
a display panel installed to have at least two-axis rotations, wherein the display panel shows images independently of the viewfinder.

12. The apparatus according to claim 1, wherein the camera unit comprises:
a flash unit to emit light when one of the camera sections photographs.

13. The apparatus according to claim 1 further comprising:
a flash memory mount section provided in the body and having a flash memory removably installed to store data including the still images.

14. The apparatus according to claim 13, wherein the flash memory mount section comprises:
a confirming window to confirm whether the flash memory is mounted.

15. The apparatus according to claim 1, wherein a top of the housing is provided with a flash unit mount section, in which a flash unit is removably installed.

16. The apparatus according to claim 1, wherein the body comprises:
a main-body provided with a moving deck, in which the tape cassette is mounted; and
a sub-body extended to a side of the main-body and faced to an end of the camera unit.

17. The apparatus according to claim 16, wherein the display unit comprises:
a viewfinder provided in the main-body;
a display panel installed in the sub-body having at least one axis rotation and driven independently of the viewfinder.

18. The apparatus according to claim 17, wherein the sub-body is provided with a panel seat recess within which the display panel is received and seated.

19. The apparatus according to claim 18, wherein an inside of the panel seating recess is provided with a signal contact terminal for signal connection with an external machine.

20. The apparatus according to claim 18, wherein an inside of the panel seating recess is provided with a speaker unit.

21. The apparatus according to claim 16, wherein opposite ends of the camera unit are formed in a curved shape, and the sub-body is provided with a curved surface curved in a shape to correspond to the curved shape of the opposite ends.

22. The apparatus according to claim 1, wherein the camera unit further comprises:
a hinge section to rotatably connect the housing to the body.

23. The apparatus according to claim 22, further comprising:
a flash memory mount section provided in the housing and having a flash memory to store still images.

24. The apparatus according to claim 22, further comprising:
a battery mount section provided in the housing to removably mount the battery.

25. The apparatus according to claim 24, wherein the battery mount section is concavely formed on an external surface of the housing and the battery is directly received and seated in the battery mount section.

26. The apparatus according to claim 24, further comprising:
a locking release unit to release a locking of the battery mounted in the battery mount section; and
a detaching unit to detach the battery from the battery mount section by forcibly pushing out the released battery.

27. The apparatus according to claim 26, wherein the detaching unit comprises:
a pushing projection installed in the bottom of the battery mount section to pop in and out; and
a spring to elastically and outwardly compress the pushing projection.

28. The apparatus according to claim 26, wherein the bottom of the battery section is provided with a pair of power terminals electrically connected to the battery.

29. The apparatus according to claim 28, wherein the locking release section and the power terminals are spaced from each other in opposite directions in the battery mount section.

30. The apparatus according to claim 24, wherein the battery mount section has at least one concavely curved surface having a radius of curvature.

31. The apparatus according to claim 22, further comprising:
a flash unit provided on top of the housing to pop in and out.

32. The apparatus according to claim 22, wherein at least one end of the housing is formed in a convexly curved shape.

33. The apparatus according to claim 22, wherein a corresponding surface of the body facing the camera unit in the OFF state among the camera sections is formed in a concavely curved shape.

34. An image photographing apparatus, comprising:
a body, on which a tape cassette is removably mounted;
a camera unit installed in the body and provided with a plurality of camera sections having pixel numbers and independently driven;
a mode sensing unit to sense a photographic mode to correspond to at least one of the camera sections;
a control unit to select a photographic mode according to a signal transferred from the mode sensing unit and to drive the camera unit to correspond to the selected photographic mode; and
a display unit provided in the body to show an image photographed by the at least one camera section,
wherein the camera sections comprise:
a first camera section used as a digital still camera to photograph still images, and
a second camera section used as a digital video camera to photograph images including moving images, wherein the second camera section has a pixel number lower than a pixel number of the first camera section, and
the first and second camera sections are located so that photographing directions thereof are opposite to each other.

35. The apparatus according to claim 34, wherein the camera unit is installed in the body to be rotatable via a predetermined angle, and the first and second camera sections are symmetrically positioned in reference to a rotation axis of the camera unit.

36. The apparatus according to claim 35, wherein the first and second camera sections are driven when positioned within a predetermined range of the rotated angle of the camera unit.

37. An image photographing apparatus, comprising:
a body, on which a tape cassette is removably mounted;
a camera unit installed in the body and provided with a plurality of camera sections having pixel numbers and independently driven;
a mode sensing unit to sense a photographic mode to correspond to at least one of the camera sections;
a control unit to select a photographic mode according to a signal transferred from the mode sensing unit and to drive the camera unit to correspond to the selected photographic mode; and
a display unit provided in the body to show an image photographed by the at least one camera section,
wherein the camera unit comprises:
a housing to receive the camera sections to be oppositely directed on a same line, and
a hinge section to rotatably connect the housing to the body,
wherein the hinge section comprises:
a first hollow shaft member rotatably installed in a bore provided in the housing; and
a second hollow shaft member assembled to be rotatable in relation to the first shaft member and secured in the bore.

38. An image photographing apparatus, comprising:
a body, on which a tape cassette is removably mounted;
a camera unit installed in the body and provided with a plurality of camera section shaving pixel numbers and independently driven;

a mode sensing unit to sense a photographic mode to correspond to at least one of the camera sections;

a control unit to select a photographic mode according to a signal transferred from the mode sensing unit and to drive the camera unit to correspond to the selected photographic mode; and a display unit provided in the body to show an image photographed by the at least one camera section, wherein the camera unit comprises:
- a housing to receive the camera sections to be oppositely directed on a same line, and
- a hinge section to rotatably connect the housing to the body, wherein the camera sections comprise:
a first camera section installed in the housing and used as a digital still camera to photograph still images; and
a second camera section to photograph images including moving images in a direction opposite to the first camera section, wherein the second camera section has a pixel number smaller than a pixel number of the first camera section.

39. The apparatus according to claim 38, wherein the housing comprises:
first manipulation buttons to manipulate a function of the first camera section; and
second manipulation buttons to manipulate a function of the second camera section.

40. The apparatus according to claim 39, further comprising:
third manipulation buttons to allow common manipulation of the individual functions of the first camera section and the second camera section according to the selected mode.

41. The apparatus according to claim 39, wherein the first and second manipulation buttons are selectively positioned in predetermined positions to correspond to driving modes of the first and second camera sections.

42. The apparatus according to claim 41, wherein the first and second manipulation buttons are mounted on first and second surfaces of the housing, respectively, the first and second surfaces being oppositely positioned to each other.

43. An image photographing apparatus, comprising:
a body, on which a tape cassette is removably mounted;
a camera unit installed in the body and provided with a plurality of camera sections having pixel numbers and independently driven;
a mode sensing unit to sense a photographic mode to correspond to at least one of the camera sections;
a control unit to select a photographic mode according to a signal transferred from the mode sensing unit and to drive the camera unit to correspond to the selected photographic mode;
a display unit provided in the body to show an image photographed by the at least one camera section,
wherein the camera unit comprises:
a housing to receive the camera sections to be oppositely directed on a same line, and
a hinge section to rotatably connect the housing to the body, and
a battery mount section provided in the housing to removably mount the battery;
a locking release unit to release a locking of the battery mounted in the battery mount section; and
a detaching unit to detach the battery from the battery mount section by forcibly pushing out the released battery, wherein the bottom of the battery section is provided with a pair of power terminals electrically connected to the battery, the locking release section and the power terminals are spaced from each other in opposite directions in the battery mount section the detaching unit is provided on the bottom of the battery mount section and positioned more adjacent to the locking release unit than to the power terminals.

44. An image photographing apparatus, comprising:
a body, on which a tape cassette is removably mounted;
a camera unit installed in the body and provided with a plurality of camera sections having pixel numbers and independently driven;
a mode sensing unit to sense a photographic mode to correspond to at least one of the camera sections;
a control unit to select a photographic mode according to a signal transferred from the mode sensing unit and to drive the camera unit to correspond to the selected photographic mode;
a display unit provided in the body to show an image photographed by the at least one camera section,
wherein the camera unit comprises:
a housing to receive the camera sections to be oppositely directed on a same line, and
a hinge section to rotatably connect the housing to the body; and
a battery mount section provided in the housing to removably mount the battery, wherein the battery mount section is concavely formed on an outside of the housing to be offset about a rotational center of the housing.

45. An image photographing apparatus, comprising:
a body, on which a tape cassette is removably mounted;
a camera unit installed in the body and provided with a plurality of camera sections having pixel numbers and independently driven;
a mode sensing unit to sense a photographic mode to correspond to at least one of the camera sections;
a control unit to select a photographic mode according to a signal transferred from the mode sensing unit and to drive the camera unit to correspond to the selected photographic mode; and
a display unit provided in the body to show an image photographed by the at least one camera section,
wherein the camera unit comprises:
a housing to receive the camera sections to be oppositely directed on a same line, and
a hinge section to rotatably connect the housing to the body; and
a battery mount section provided in the housing to removably mount the battery,
wherein the battery mount section has at least one concavely curved surface having a radius of curvature,
the housing has a curved surface in at least one end thereof formed to have a center of curvature identical to a center of curvature identical of the concavely curved surface of the battery mount section.

46. The apparatus according to claim 45, wherein the centers of curvature of the curved surface of the housing and the battery mount section coincide with the rotational center of the housing.

47. The apparatus according to claim 45, wherein a side of the body facing the housing is provided with a curved surface to correspond to the curved surface of the housing and the concavely curved surface of the housing.

48. The apparatus according to clam 47, wherein the curved surface of the housing, the concavely curved surface and the curved surface of the body have an identical rotational center and a different radii of curvature.

49. An image photographing apparatus, comprising:
a body, on which a tape cassette is removably mounted;
a camera unit installed in the body and provided with a plurality of camera sections having pixel numbers and independently driven;
a mode sensing unit to sense a photographic mode to correspond to at least one of the camera sections;
a control unit to select a photographic mode according to a signal transferred from the mode sensing unit and to drive the camera unit to correspond to the selected photographic mode; and
a display unit provided in the body to show an image photographed by the at least one camera section,
wherein the camera sections comprise:
   a first camera section used as a digital still camera to photograph still images, and
   a second camera section used as a digital video camera to photograph images including moving images, wherein the second camera section has a pixel number lower than a pixel number of the first camera section,
wherein the camera unit comprises:
a housing to receive the first and second camera sections to be oppositely oriented with reference to the rotational axis; and
a hinge section to rotatably connect the housing to the body.

50. The apparatus according to claim 49, wherein an outside of the housing comprises:
a battery mount section having a battery removably mounted, and installed to be offset toward the second camera section.

51. An image photographing apparatus, comprising:
a body, on which a tape cassette is removably mounted;
a camera unit installed in the body and provided with a plurality of camera sections having pixel numbers and independently driven;
a mode sensing unit to sense a photographic mode from among a plurality of different photographic modes to correspond to at least one of the camera sections;
a control unit to select the photographic mode according to a signal transferred from the mode sensing unit and to drive the camera unit to correspond to the selected photographic mode; and
a display unit provided in the body to show an image photographed by the camera section,
wherein the camera unit is installed in the body to be rotatable in relation to the body, and the photographic mode sensed by the mode sensing unit is determined from among the different photographic modes according to a rotated angle of the camera unit.

* * * * *

UNITED STATES PATENT AND TRADEMARK OFFICE
CERTIFICATE OF CORRECTION

PATENT NO. : 7,405,751 B2 Page 1 of 1
APPLICATION NO. : 10/680418
DATED : July 29, 2008
INVENTOR(S) : Chang-hee Lee et al.

It is certified that error appears in the above-identified patent and that said Letters Patent is hereby corrected as shown below:

Column 12, Line 59, change "claim 1" to --claim 1,--.

Column 14, Line 66, change "shaving" to --having--.

Signed and Sealed this

Sixteenth Day of December, 2008

JON W. DUDAS
*Director of the United States Patent and Trademark Office*